United States Patent [19]
Rush

[11] 3,960,668
[45] June 1, 1976

[54] SOLAR POWERED SEA WATER EVAPORATING AND CONDENSING UNIT

[76] Inventor: Martin A. Rush, 2501 Cincinnati-Dayton Road, Middletown, Ohio 45042

[22] Filed: July 3, 1974

[21] Appl. No.: 485,577

[52] U.S. Cl. .......................... 202/185 R; 202/234; 203/DIG. 17
[51] Int. Cl.² .......................................... B01D 3/00
[58] Field of Search ................. 159/1 S, 2; 202/234, 202/185 B, 173; 203/DIG. 1, 173, DIG. 17; 9/8; 115/15 R, 3, 4; 60/495

[56] References Cited
UNITED STATES PATENTS

| | | | |
|---|---|---|---|
| 983,424 | 2/1911 | Brosius | 203/DIG. 1 |
| 1,544,029 | 6/1925 | Nelson | 202/152 |
| 2,006,985 | 7/1935 | Claude et al. | 159/2 R |
| 2,424,142 | 7/1947 | Bimpson et al. | 202/234 X |
| 2,636,129 | 4/1953 | Agnew | 202/185 X |
| 3,281,334 | 10/1966 | Williamson | 159/2 R |
| 3,334,026 | 8/1967 | Dobell | 159/1 S |
| 3,488,260 | 1/1970 | Gilbert | 202/173 |
| 3,489,650 | 1/1970 | Williamson | 202/173 |

Primary Examiner—Jack Sofer
Attorney, Agent, or Firm—Clarence A. O'Brien; Harvey B. Jacobson

[57] ABSTRACT

A buoyant structure is provided including an upwardly opening solar furnace having a boiler disposed therein and an upper sun ray collecting and concentrating structure at its upper end for collecting and directing rays from the sun incident thereon onto heat transfer and absorbing surfaces of the boiler. The sun ray collecting and concentrating structure is supported above the normal water line of the buoyant structure and the latter supports an exteriorly mounted condenser unit below the water line of the buoyant structure. Air convection lines extend between the boiler and the condenser for the purpose of ducting hot moist air from the boiler into the condenser and cool drier air from the condenser back into the boiler.

8 Claims, 2 Drawing Figures

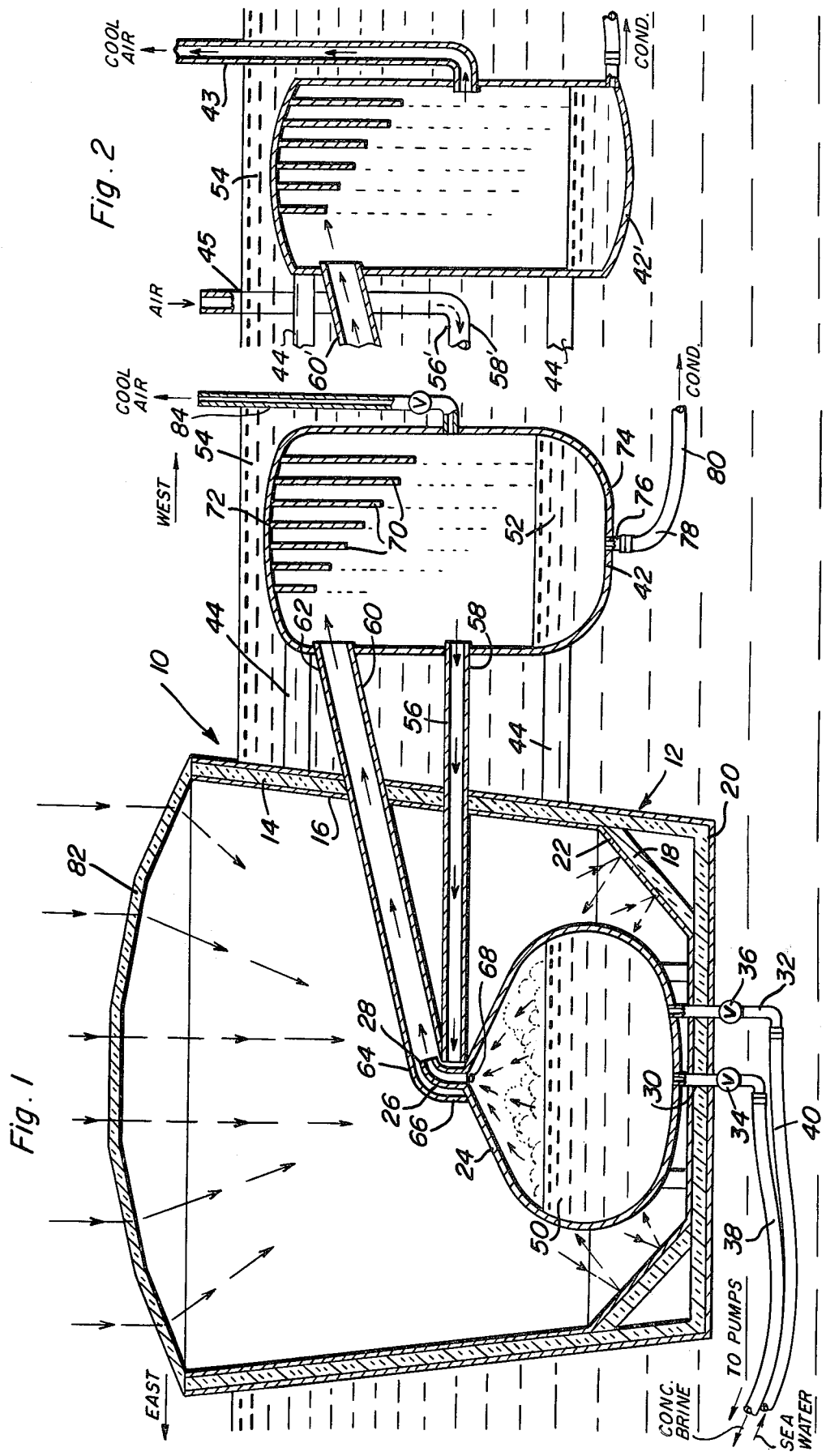

SOLAR POWERED SEA WATER EVAPORATING AND CONDENSING UNIT

BACKGROUND OF THE INVENTION

Solar stills have been heretofore designed but most have included structural features which do not include structure adapting the stills for use in an environment dominated by a large body of water. Further, while a lesser number of solar stills have been designed for use in environments dominated by large bodies of water these solar stills have included structural features which render them impractical to use in certain instances. Examples of previously patented solar stills may be found in U.S. Pat. Nos. 1,302,363, 1,544,029, 2,636,129, 3,338,797 and 3,351,536.

BRIEF DESCRIPTION OF THE INVENTION

The solar still of the instant invention has been designed for use in large scale water condensing environments as well as for use in smaller scale water condensing environments. The still may be constructed of such large dimensions as to have a relatively high capacity to provide the fresh water needs of communities of various sizes and it may also be constructed of such small dimensions to render it highly adaptable to provide condensed or distilled water for use by single persons or small groups of persons such as may find themselves adrift on a large body of salt water without a supply of fresh drinking water.

The main object of this invention is to provide an efficient solar still for the purpose of providing distilled water from sea water.

Another object of this invention is to provide a solar still which may be readily constructed of various sizes and thus to provide various water distilling capacities.

A still further object of this invention is to provide a solar still constructed in a manner so that it may be operative while floating in a large body of sea water.

Another important object of this invention is to provide a solar still which will be capable of sufficiently concentrating the sun's radiation on the boiler portion thereof to effect rapid evaporation and condensation of sea water.

A final object of this invention to be specifically enumerated herein is to provide a solar still in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a vertical sectional view of a solar still constructed in accordance with the present invention illustrated floating in a large body of sea water; and FIG. 2 is a fragmentary vertical sectional view illustrating a modified form of condenser unit which may be used in lieu of the similar condensing unit illustrated in FIG. 1.

DETAILED DESCRIPTION OF THE INVENTION

Referring now more specifically to the drawings the numeral 10 generally designates the solar still or solar powered sea water condensing unit of the instant invention. The still 10 includes an upwardly opening closed bottom housing referred to in general by the reference numeral 12 and the inner surfaces of the housing 12 are lined with a heat insulative layer 14. Also, the inner surfaces of the heat insulating layer 14 are covered by a suitable light-reflective layer or surface 16.

The heat insulative layer 14 includes an inverted frusto-conical section 18 which bridges the corner defined between the downwardly tapering external walls of the housing 12 and the bottom wall 20 of the housing and the heat-reflecting layer or surface 16 includes a section 22 which overlies the inner surfaces of the section 18.

A bulbous boiler 24 is supported within the bottom portion of the housing 12 and includes an upwardly opening outlet neck 26 including an upper laterally outwardly and upwardly inclined terminal outlet end 28. Additionally, the boiler 24 includes sea water inlet and outlet pipes 30 and 32 valved as at 34 and 36, respectively, which open upwardly into the bottom of the boiler 24 through the bottom wall 20 of the housing 12 and downwardly into the outlet and inlet ends of inlet and outlet lines 38 and 40. The opposite ends of the lines 38 and 40 may also be suitably valved and equipped with powered or hand-operated pump means (not shown) if desired.

One side of the housing 12 has a closed condenser housing 42 supported therefrom by suitable braces 44 and the weight of the complete solar still including the housings 12 and 42 and a predetermined quantity of sea water 50 in the boiler 24 as well as a predetermined quantity of fresh water 52 in the condenser housing 42 is such that the still 10 will float in a body of sea water 54 with at least the upper portion of the housing 12 disposed above the level of the sea water 54 and the upper end of the housing 42 disposed below the surface of the sea water 54.

A return conduit or pipe 56 includes an inlet end 58 which opens into the interior of the housing 42 above the lower end thereof and below the upper end thereof and an outlet pipe or conduit 60 includes an outlet end 62 which opens into an upper portion of the housing 42 at a level spaced above the inlet end 58 of the return pipe 56.

The outlet pipe 60 is inclined downwardly toward its inlet end 64 and passes through an upper portion of the wall portion of the housing 12 adjacent the housing 42. The inlet end 64 includes a downwardly directed terminal end 66 which is downwardly telescoped over the neck 26 and sealingly joined to the adjacent upper wall portions of the boiler 24, there being provided return openings 68 in the upper wall portions of the boiler 24 adjacent the inlet end of the neck 26 and within the confines of the terminal end 66. The return pipe or conduit 56 is generally horizontally disposed and passes through the wall portion of the housing 12 adjacent the housing 24 at an elevation spaced below that portion of the housing wall through which the pipe 60 extends and the outlet end of the return pipe or conduit 56 opens into the terminal end 66 of the outlet pipe 60.

A plurality of condensing baffles 70 are dependingly supported from the inner surfaces of the upper wall 72 of the housing 42 and positioned within the housing 42 in registry with the outlet end 62 of the outlet pipe 60. Further, the bottom wall 74 of the housing 42 includes an outlet pipe or fitting 76 to which the inlet end 78 of a fresh water supply line 80 is connected.

The upper open end of the housing 12 is closed by means of a sunlight ray collecting and concentrating structure 82 and the internal surfaces of the light-reflecting layer 16 are such to reflect a maximum amount of light rays incident thereon. However, the external surfaces of the boiler 24 are such to absorb radiant heat from light rays impinging upon the boiler 24.

In operation, the still 10 is placed in the body of water 54 and a predetermined quantity of sea water 50 is admitted into the boiler 24 through the inlet line or hose 38. As light rays from the sun impinge upon the structure 82 they are collected by the latter and concentrated on the external surfaces of the boiler 24. Further, any stray light rays incident upon the layer 16 are reflected within the housing 12 upon the boiler 24. As a result of the collected and reflected sun rays being directed upon the heat absorbing outer surfaces of the boiler 24 the water 50 within the boiler 24 is heated and transformed into hot water vapor which then rises through the neck 26 and into the inlet end of the outlet pipe 60 for movement upwardly through the latter and into the upper portion of the condenser housing 42 whereupon the heated water vapors impinge upon the condenser plates or baffles cooled by the surrounding sea water 54 causing water within the water vapor to be condensed upon the plates or baffles 70 and to run down the latter by gravity for subsequent collection in the bottom of the housing 42. The air from which water has been condensed in the housing 42 is reduced in temperature and falls by convection currents to a lower portion of the housing 42 and thereafter into the return pipe or conduit 56 for passage back into the housing 12 and into the terminal end portion 66. Any water which is condensed out of the returning air within the pipe 56 flows toward the outlet end thereof and into the lower portion of the terminal end 66 and thereafter through the openings or bores 68 and back into the boiler 24. However, if the housing 42 is of considerably greater vertical extent the pipe 56 may be upwardly inclined toward its outlet end whereby any residue of water condensing in the pipe 56 will fall downwardly therein by gravity and back into the lower portion of the housing 42.

If after a certain portion of the sea water 50 within the boiler 24 is evaporated therefrom the concentration of salt in the remainig water within the boiler 24 becomes excessive, the valve 36 and the corresponding valve on the outlet end of the line or hose 40 may be opened and the remaining water within the boiler 24 may be pumped therefrom and replaced by additional sea water having less salt content. Further, after a given quantity of fresh water 52 has been collected within the housing 42 this fresh water may be withdrawn from the housing 42 through the hose or pipe 80. Also, the housing 42 may be provided with a valved vent line 84 for selectively venting housing 42 in the event it becomes necessary to relieve a build-up of air pressure therein as a result of air entrained in water admitted into the housing 42 through the hose 38.

By the housing 42 being supported from one side of the housing 12 the still 10 can be constructed in a manner such that it will gradually tilt in the direction in which the sun is moving throughout operation of the still as the quantity of water 50 is reduced and the quantity of water 52 is increased. Therefore, by properly anchoring the still 10 in a manner such that the housing 12 is disposed to the east and the housing 42 is disposed to the west, the still 10 may tilt from east to west, during evaporation of each daily batch of water from the housing 12 and its condensation in the housing 42, along the path followed by the sun to increase the efficiency of the light collecting and concentrating structure 82. Further, inasmuch as the housing 42 is maintained completely submerged in the water 54, efficient operation of the condenser comprising the housing 42 is assured.

It will also be noted that the boiler 24 is operative to discharge a jet of moist water vapor therefrom in response to the water 50 being heated within the boiler 24 and that this jet discharge of water vapor will have a venturi effect within the inlet end of the outlet pipe 60 to reduce the pressure at the outlet end of the return pipe 56 and thus enhance circulation of air and water vapor through the outlet pipe 60 and into the housing 42 and the return of cooler dry air from the housing 42 through the return pipe 56 into the terminal end 66 of the pipe 60.

With attention now invited more specifically to FIG. 2 of the drawings there may be seen a modified form of condensing unit including a housing 42'. However, the housing 42' includes an upstanding vent pipe 43 whose upper outlet end opens above the level of the water 54 and whose inlet end opens into a lower portion of the housing 42' in lieu of the inlet end 58 of the return pipe 56. In addition, the inlet end 58 of the return pipe 56, instead of opening into the housing 42', includes an upstanding inlet standpipe 45 whose upper inlet end also opens upwardly above the level of the water 54.

The operation of the condenser or housing 42' is substantially identical to operation of the housing 42. However, heated air entering the housing 42' through the outlet pipe 60' is exhausted from the housing 42' through the standpipe 43 and replaced by fresh ambient air entering the standpipe 45 and passing downwardly therethrough into the inlet end 58' of the return line 56' leading to the remote terminal end of the outlet pipe 60'.

If tilting of the still 10 as water is evaporated from housing 12 and condensed in housing 42 is not desired, the still 10 may be stationarily supported in the associated body of water. Further, suitable pumps (not shown) may be operatively associated with the ends of the hoses 38 and 40 remote from the housing 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A solar still including side-by-side first and second hollow housings, rigid connecting means extending between and interconnecting said housings, said first housing having a boiler disposed therein and including light collecting and concentrating means over its upper end for collecting sunlight rays incident thereon and concentrating said light rays on said boiler, said boiler including an upper heated water vapor outlet, an upwardly inclined heated vapor discharge tube extending from said outlet through the wall of said first housing adjacent said second housing and opening into an upper portion of said second housing, heat conducting baffle means supported within the upper portion of said second housing in good heat transfer relation with said second housing, said second housing including cooled air outlet means opening outwardly of said second housing below the discharge end of said discharge tube and discharging to atmosphere via a vent tube, a cool air inlet pipe for said first housing passing through its wall and opening into said discharge tube adjacent the lower end thereof, said still having a total weight somewhat less than the total volume of water displaceable thereby whereby said still may be floated in a body of salt water, the elevation of said second housing relative to said first housing being such that said second housing is at least substantially fully submerged when said still is floating, thereby enabling the ambient water to shield the second housing against direct rays of the sun incident thereon, said still being positionable with the first housing disposed to the east and the second housing disposed to the west, whereby the still may tilt from east to west, during vaporization of a batch of water from said boiler and its condensation in said second housing, to thereby increase the efficiency of the light collecting and concentrating means.

2. The combination of claim 1 wherein said water vapor outlet defines a jet discharge nozzle opening into the inlet end of said discharge tube downstream therealong, the outlet end of said inlet pipe opening into said discharge tube upstream from said nozzle.

3. The combination of claim 1 wherein the lower end of said second housing includes condensed water outlet means.

4. The combination of claim 1 wherein the interior of said first housing includes light-reflective surfaces for reflecting stray light rays onto said boiler, at least those portions of said first housing disposed below the water line thereof being insulated against the transfer of heat from the interior of said first housing to the exterior thereof.

5. The combination of claim 1 wherein the lower portion of said boiler includes concentrated water outlet means opening downwardly by gravity through said first housing.

6. The combination of claim 5 including water inlet means for said boiler.

7. A solar still including side-by-side first and second hollow housings, rigid connecting means extending between and interconnecting said housings, said first housing having a boiler disposed therein and upon which light rays incident from the sun passing downwardly through the upper portion of said housing may be directed, said boiler including an upper heated vapor outlet, an upwardly inclined discharge tube extending from said outlet through the wall of said first housing and opening into an upper portion of said second housing, heat exchange means within said second housing in good heat transfer relation with the walls of said second housing, said second housing being constructed of a material having good heat transfer properties and including cooled air outlet means opening outwardly of said second housing below the discharge end of said discharge tube via a vent tube, and cool air inlet means for said first housing passing through its wall and opening into said discharge tube adjacent the lower end thereof, said cool air outlet means and said cool air inlet means comprising inlet and outlet ends, respectively, of a conduit communicating the interior of said second housing with the interior of the lower end portion of said discharge tube, said vent opening outwardly to the ambient air above said second housing and said cool air inlet means includes a cool air supply conduit whose discharge end opens into said discharge tube and whose inlet end is elevated above the top of said second housing and is open to the ambient air, said second housing being bathed in a liquid coolant.

8. A solar still including side-by-side first and second sealed housings, connecting means extending between and interconnecting said housings against relative displacement, said first housing having a boiler disposed therein and upon which light rays from the sun passing downwardly through the upper portion of said housing may be directed, said boiler including an outlet for heated vapor extending between said first and second housings and opening into the interior of the latter, said second housing including heat exchange means in good heat transfer relation with the walls of said second housing and upon which heated vapor from said boiler outlet may impinge, said second housing also including condensed water collecting means for extracting condensed water therefrom, said boiler including means for admitting water to be vaporized thereinto, a vent tube for said second housing communicated at one end with the interior of said second housing and opening into the atmosphere at its other end, the walls of said second housing being constructed of a material having good heat transfer properties, said still having a total weight somewhat less than the total volume of water displaceable thereby, whereby said still may be floated in a body of water, the elevation of said second housing relative to said first housing being such that said second housing is at least substantially fully submerged when said still is floating, thereby enabling the ambient water to shield said second housing against direct rays of the sun incident thereon and to place the wall portions of said second housing in good heat transfer relation with said ambient water, said still being positionable with the first housing disposed to the east and the second housing disposed to the west, whereby the still may tilt from east to west, during vaporization of a batch of water from said boiler and its condensation in said second housing, to thereby increase the efficiency of said still by inclining the upper end of said first housing toward the sun during its movement from east to west.

* * * * *